(12) United States Patent
Egner-Walter et al.

(10) Patent No.: US 9,580,049 B2
(45) Date of Patent: Feb. 28, 2017

(54) FLAT WIPER BLADE

(75) Inventors: Bruno Egner-Walter, Heilbronn (DE); Michael Schauble, Vaihingen/Enz (DE)

(73) Assignee: Valeo Systèms d'Essuyage, La Verriere (FR)

( * ) Notice: Subject to any disclaimer, the term of this patent is extended or adjusted under 35 U.S.C. 154(b) by 0 days.

(21) Appl. No.: 13/382,216

(22) PCT Filed: Jul. 8, 2010

(86) PCT No.: PCT/EP2010/004172
§ 371 (c)(1),
(2), (4) Date: Jan. 27, 2012

(87) PCT Pub. No.: WO2011/003613
PCT Pub. Date: Jan. 13, 2011

(65) Prior Publication Data
US 2012/0117746 A1    May 17, 2012

(30) Foreign Application Priority Data

Jul. 8, 2009  (DE) .......................... 10 2009 032 376

(51) Int. Cl.
*B60S 1/40*  (2006.01)
*B60S 1/48*  (2006.01)
(Continued)

(52) U.S. Cl.
CPC .............. *B60S 1/482* (2013.01); *B60S 1/3805* (2013.01); *B60S 1/3862* (2013.01); *B60S 1/524* (2013.01);
(Continued)

(58) Field of Classification Search
CPC .... B60S 1/3803; B60S 1/3805; B60S 1/3851; B60S 1/3848
(Continued)

(56) References Cited

U.S. PATENT DOCUMENTS 2,627,011 A * 1/1953 Eaves ......................... 15/250.07
3,489,884 A * 1/1970 Waseleski, Jr. ............... 219/522
(Continued)

FOREIGN PATENT DOCUMENTS

DE    100 39 290 A1   2/2002
DE    102 34 267 A1   2/2004
(Continued)

OTHER PUBLICATIONS

International Search Report from PCT/EP2010/004172 dated Oct. 6, 2010 (3 pages).
(Continued)

*Primary Examiner* — Michael Jennings
(74) *Attorney, Agent, or Firm* — Osha Liang LLP

(57) ABSTRACT

Flat wiper blade for windscreen wiper modules, having a wiper blade body, which presents at least one wiping rubber (12) forming at least one wiping lip (12.1), presents at least one spring rail (11) in addition to at least one retaining strip (10) on which the wiping rubber (12) is held and which (retaining strip (10)) possesses at least one profile section designed as a hollow profile, in which at least a partial length of the spring rail (11) is accommodated, wherein at least one heating foil (19) is arranged over at least a partial length together with the at least one spring rail (11) in the profile section (10.1) of the retaining strip (10).

10 Claims, 9 Drawing Sheets

(51) Int. Cl.
*B60S 1/52* (2006.01)
*B60S 1/38* (2006.01)

(52) U.S. Cl.
CPC .............. *B60S 1/381* (2013.01); *B60S 1/3803* (2013.01); *B60S 1/3849* (2013.01); *B60S 1/3881* (2013.01)

(58) Field of Classification Search
USPC .............. 15/250.07, 250.08, 250.43, 250.44, 15/250.451, 250.32, 250.201
See application file for complete search history.

(56) References Cited

U.S. PATENT DOCUMENTS

| | | | | |
|---|---|---|---|---|
| 4,928,344 | A * | 5/1990 | Bliss | 15/250.06 |
| 4,967,437 | A * | 11/1990 | Morse | 15/250.07 |
| 5,412,177 | A * | 5/1995 | Clark | 219/203 |
| 5,632,058 | A * | 5/1997 | Stanak | 15/250.04 |
| 5,749,118 | A * | 5/1998 | Holland | 15/250.07 |
| 6,028,291 | A * | 2/2000 | Heisler | 219/203 |
| 6,140,608 | A * | 10/2000 | Stingone, Jr. | 219/202 |
| 6,591,443 | B1 | 7/2003 | Gilpin | |
| 7,503,095 | B2 * | 3/2009 | Lin | B60S 1/381 15/250.201 |
| 7,721,382 | B2 * | 5/2010 | Malone | 15/250.201 |
| 8,020,246 | B2 * | 9/2011 | Bauer et al. | 15/250.201 |
| 8,191,198 | B2 * | 6/2012 | Egner-Walter | B60S 1/386 15/250.04 |
| 8,327,496 | B2 * | 12/2012 | Kim | 15/250.07 |
| 8,327,498 | B2 * | 12/2012 | Kim | 15/250.201 |
| 2006/0156529 | A1 * | 7/2006 | Thomar et al. | 29/450 |
| 2007/0094832 | A1 * | 5/2007 | Franco et al. | 15/250.05 |
| 2007/0113366 | A1 * | 5/2007 | Walworth et al. | 15/250.32 |
| 2007/0174989 | A1 | 8/2007 | Moll et al. | |
| 2007/0175017 | A1 * | 8/2007 | Kim | 29/557 |
| 2008/0216274 | A1 | 9/2008 | Egner-Walter et al. | |
| 2008/0256738 | A1 * | 10/2008 | Malone | 15/250.06 |
| 2008/0263806 | A1 * | 10/2008 | Egner-Walter | B60S 1/386 15/250.01 |
| 2008/0263809 | A1 * | 10/2008 | Bousset | 15/250.32 |
| 2008/0295272 | A1 * | 12/2008 | Jarasson | 15/250.32 |
| 2009/0056049 | A1 * | 3/2009 | Jarasson | B60S 1/381 15/250.32 |
| 2009/0070952 | A1 * | 3/2009 | Peng | 15/250.06 |
| 2009/0100626 | A1 * | 4/2009 | Kim | 15/250.05 |
| 2009/0223010 | A1 * | 9/2009 | Richey | 15/250.32 |

FOREIGN PATENT DOCUMENTS

| | | | |
|---|---|---|---|
| JP | 3075512 U | 2/2001 | |
| JP | 2006-076464 A | 3/2006 | |
| WO | 2008/099056 A1 | 8/2008 | |
| WO | WO 2009065648 A1 * | 5/2009 | ............... B60S 1/38 |
| WO | 2009/118286 A1 | 10/2009 | |

OTHER PUBLICATIONS

Office Action issued in corresponding Japanese Application No. 2012-518827 dated Apr. 1, 2014, and English translation thereof (6 pages).

Office Action issued in corresponding Chinese Application No. 201080039933.1 dated Oct. 8, 2013, and English translation thereof (11 pages).

Office Action issued in corresponding Chinese Application No. 201080039933.1 dated Jul. 29, 2014, and English translation thereof (13 pages).

* cited by examiner

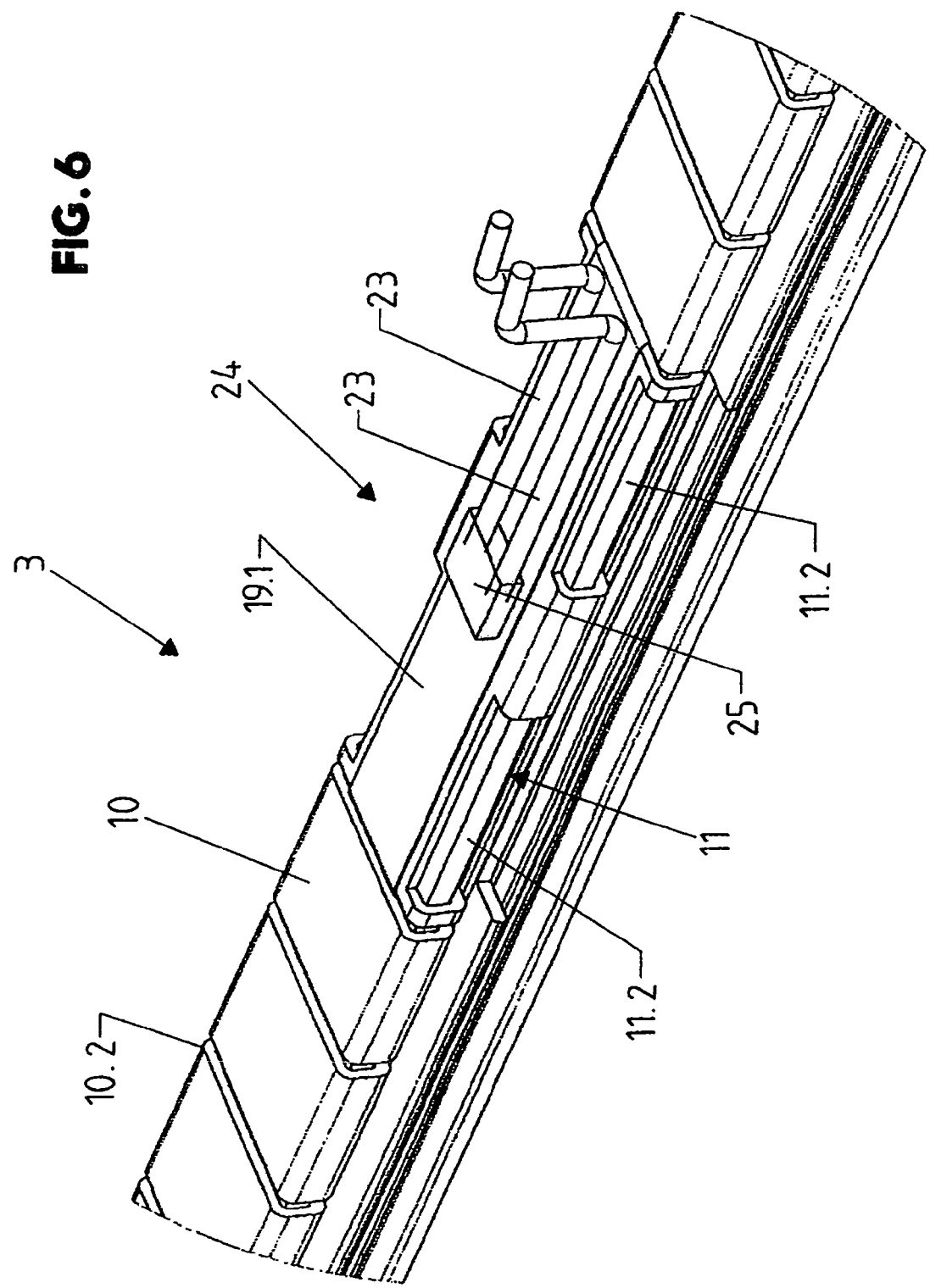

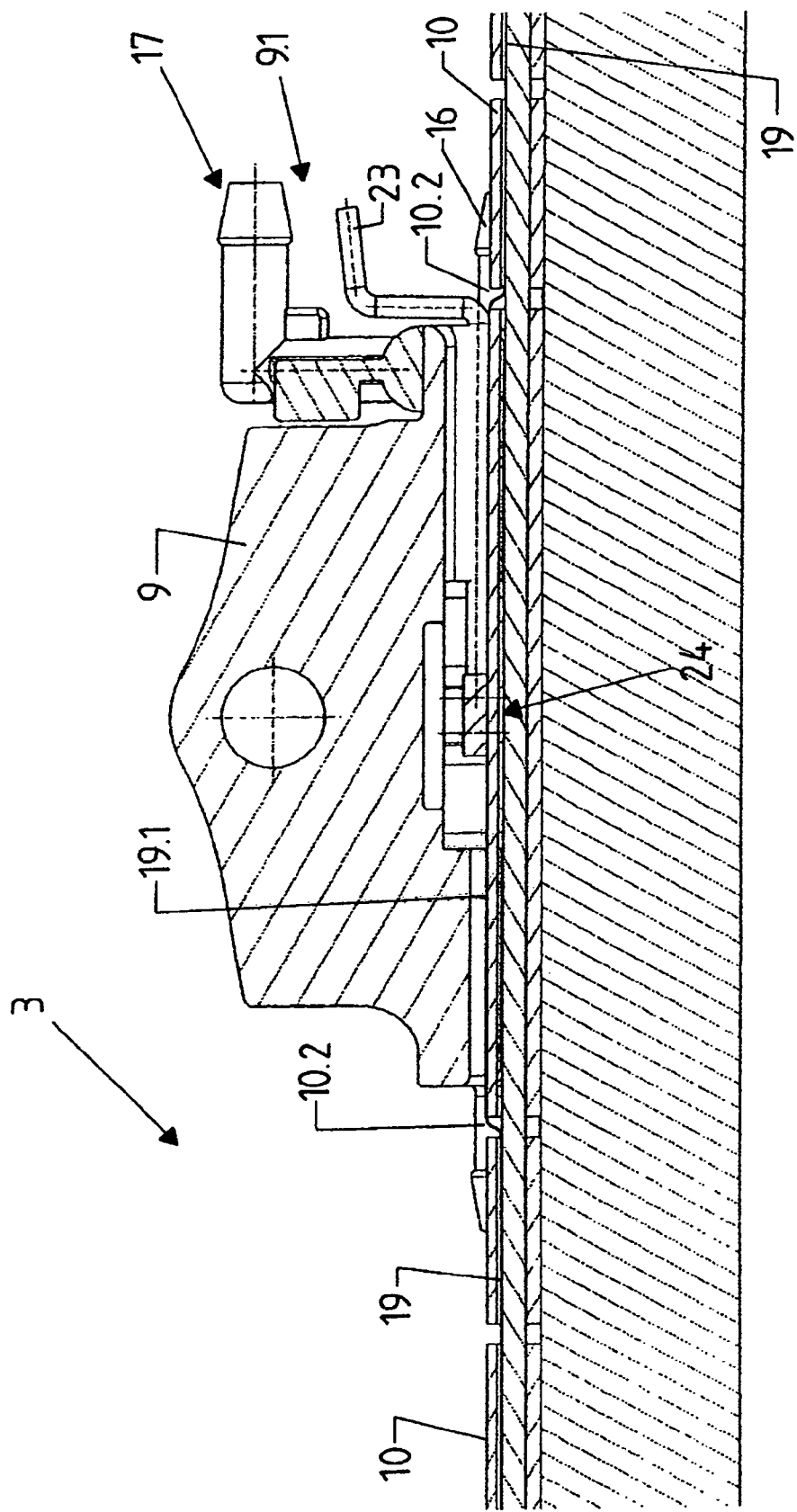

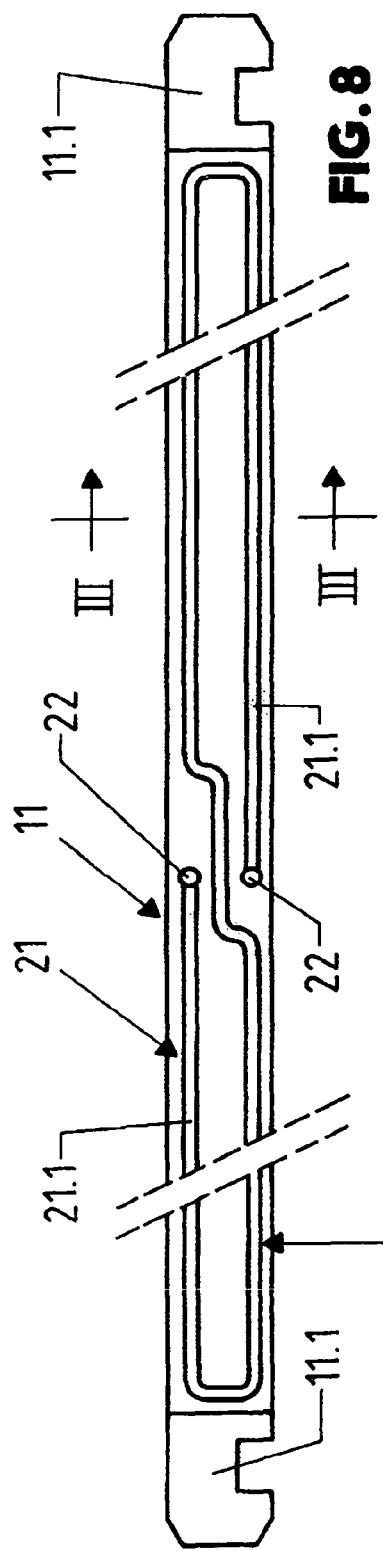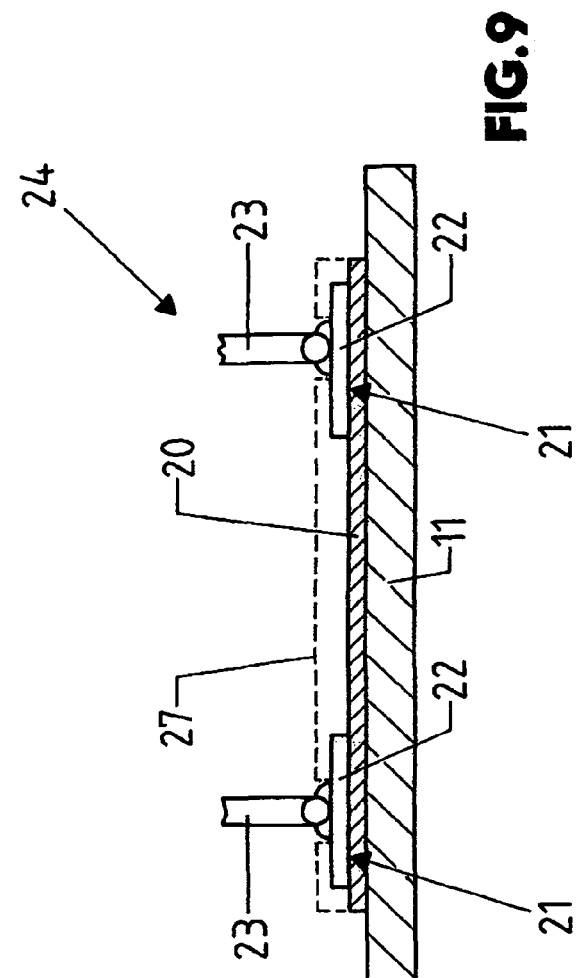

FLAT WIPER BLADE

The invention refers to a flat wiper blade according to the generic term of patent claim 1.

Flat wiper blades, which essentially consist respectively of at least one spring rail, a wiping rubber connected to the spring rail and forming at least one wiping lip, in addition to a wiper blade adapter, with which the respective wiper blade can be detachably mounted on a wiper arm and on an adapter on the wiper arm side at this position, are also known in particular in various different embodiments for windscreen wiper modules of road vehicles.

Also known in this case are electrically heatable flat wiper blades (DE 102 34 267 A1), which present at least one electric heating element composed of a heating filament or a heating foil, which is subsequently covered towards the outside for instance by a spoiler profile held on the upper side of the wiper blade by locking or however arranged in a recess of the wiping rubber by the spring rail connected to the wiping rubber. It is disadvantageous among other aspects that these known wiper blades are elaborate in terms of design and production engineering and also that the heat transfer from the respective heating element to the areas of the wiper blade to be heated is ineffective and indeed particularly when heat transfer is performed via the wiping rubber.

In addition, flat wiper blades are known (DE 100 39 290 A1), in which two of electric heating elements each composed of a heating foil are arranged on the underside of the wiper blade exposed on both sides of the tilting web and therefore not protected against environmental influences. Furthermore, in this case also, heat is again transferred ineffectively via the respective wiping rubber.

Also known furthermore are electrically heatable wiper blades designed as bow wiper blades having respectively one wiping rubber and two spring rails accommodated in longitudinal grooves of the wiping rubber (U.S. Pat. No. 6,591,443 B1). Heating foils serve as heating elements and are likewise accommodated in the longitudinal grooves of the wiping rubber. It is disadvantageous among other aspects that the electrical connection of the heating foils to an external electrical supply lead is performed via a plug connection and a double plug connector, the contacts of which engage in sockets embedded in the wiping rubber. Apart from the fact that this known wiper blade does not involve a flat wiper blade and that owing to the nature of the electrical connection, it does not fulfil the current quality requirements and is also extremely susceptible to faults, these known wiper blades also present the disadvantage that the heating elements and heating foils are arranged to the greatest extent unprotected. The nature of the electrical connection of the heating elements in turn requires elaborate manufacture of the respective wiping rubber.

The purpose of the invention is to demonstrate a wiper blade that avoids the above-mentioned disadvantages and which with the possibility of rational production, ensures optimum heat transfer from the at least one heating foil to the wiper blade and to the latter's areas to be heated, in addition to an arrangement of the heating foil which is protected against external influences. In order to solve this problem, a wiper blade according to patent claim 1 is developed.

Further developments, advantages and application possibilities of the invention are also apparent from the following description of examples of embodiment and from the figures. In this case, all the characteristics described and/or illustrated are in themselves or in any desired combination fundamentally a subject of the invention, regardless of their summary in the claims or their backward relation. The contents of the claims are also made an integral part of the description.

The invention is described below in further detail in examples of embodiment based on the figures:

FIG. 6 shows an enlarged perspective individual representation of the arrangement in FIG. 3 in the centre of the wiper blade;

FIG. 7 shows a partial representation of a longitudinal section through the arrangement in FIG. 3 with the wiper blade adapter installed;

FIG. 8 shows a schematic representation of a top view of the spring rail with the heating foil;

FIG. 9 shows a section along the line III-III in FIG. 8;

Figure 1:
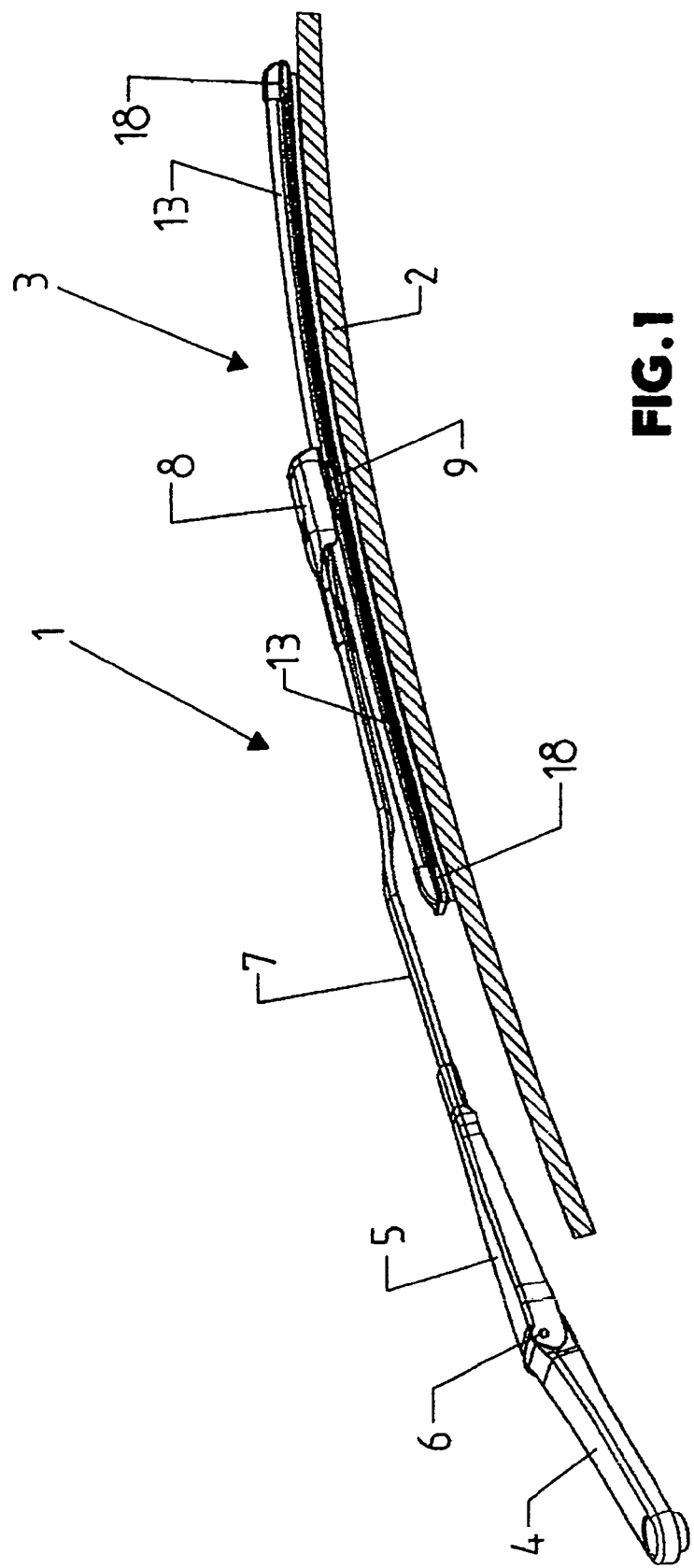
FIG. 1 shows a simplified representation of a wiper arm together with a wiper blade provided on this wiper arm and in contact with a vehicle windscreen.

FIG. 1 illustrates a wiper arm 1 together with a wiper blade 3 detachably mounted on this wiper arm and in contact with a vehicle windscreen 2 which is executed as a flat wiper blade or a flat wiper-blade in the manner described in further detail below.

The wiper arm 1 is designed in the usual manner, i.e. consisting of a bearing section 4 for attachment to a wiper shaft, not illustrated, of the vehicle windscreen wiper module, an articulation piece 5, which is connected to the bearing section 4 by means of a wiper arm articulation 6 and a wiper rod 7, connected to the articulation piece 5, carrying on its free end an adapter 8 on the wiper arm side. By means of this adapter 8, the wiper blade 3 is detachably connected to the wiper arm 1 in the manner described below mechanically by means of an adapter or wiper blade adapter 9 on the wiper blade side and also hydraulically in the form of embodiment presented.

The wiper blade 3 is executed as an electrically heated wiper blade and indeed in the embodiment presented also as a wet wiper blade, by means of which controlled application of a washing or cleaning fluid (water with cleaning and/or antifreeze additives if required) to the vehicle screen 2 is also additionally possible.

As can be gathered from FIGS. 3-7 in particular, the wiper blade 3 comprises among other aspects a profile or retaining strip 10, preferably manufactured from plastic, which extends over the entire or almost entire length of the wiper blade 3 and which accommodates in a profile section 10.1 designed as a hollow profile a flat spring rail 11 manufactured from spring steel, which likewise extends over the entire length of the wiper blade 3 and which has sections 11.1 projecting from the retaining strip 10 at both wiper blade ends. In order to avoid impairment of the necessary flexibility of the wiper blade 3 by the retaining strip 10, the latter is provided with a large number of notches 10.2 on its hollow profile section receiving the spring rail 11. In order to allow attachment of the wiper blade adapter 9 to the spring rail 11, the retaining strip 10 is also laterally open on its profile section 10.1 receiving the spring rail, so that the spring rail 11 is exposed at this position with peripheries 11.2 for attachment of the wiper blade adapter 9.

Figure 2:
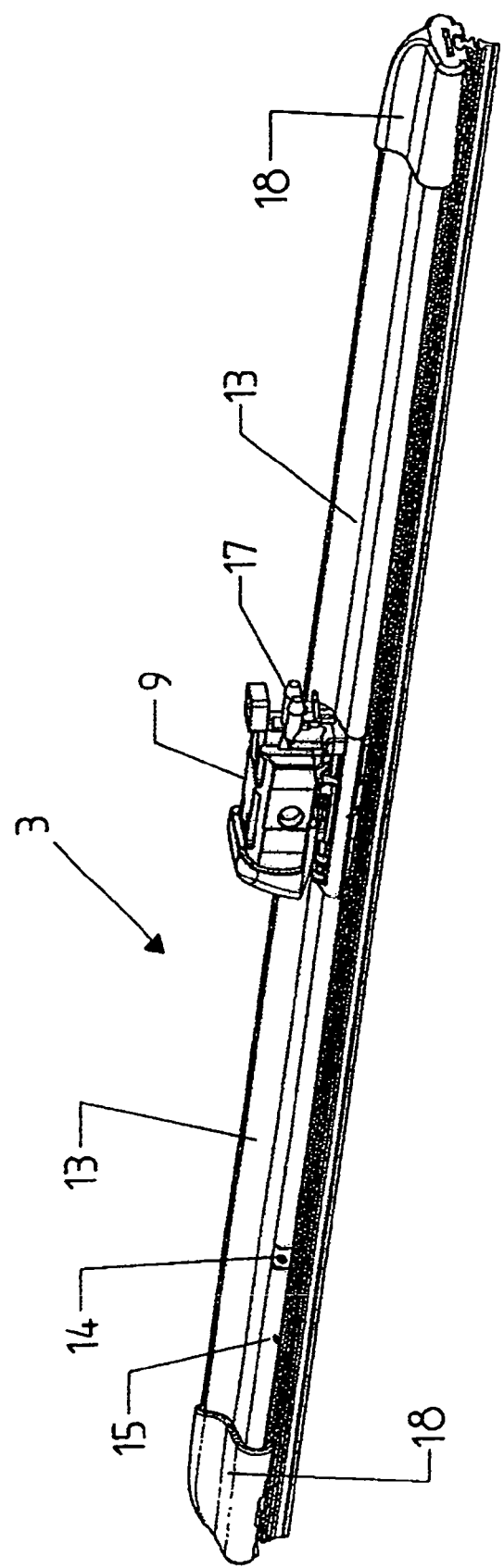
FIG. 2 shows a perspective individual representation of the wiper blade in FIG. 1 together with a wiper blade adapter, shortly before final installation of this adapter on the wiper blade.
Figure 3:
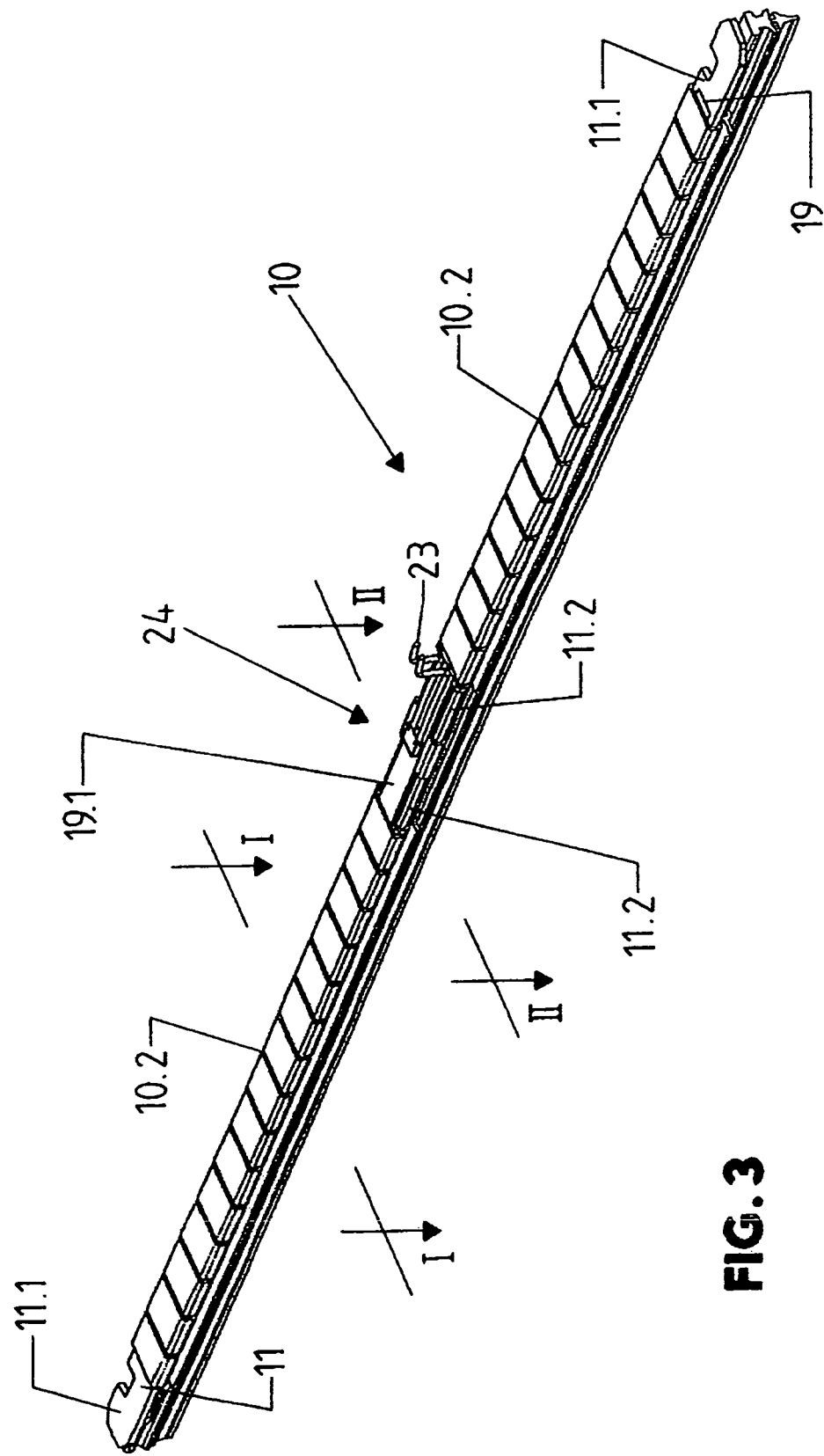
FIG. 3 shows a perspective representation of a retaining strip of the wiper blade in FIGS. 1 and 2, together with a heating foil, a spring rail and a wiping rubber.
Figure 4:
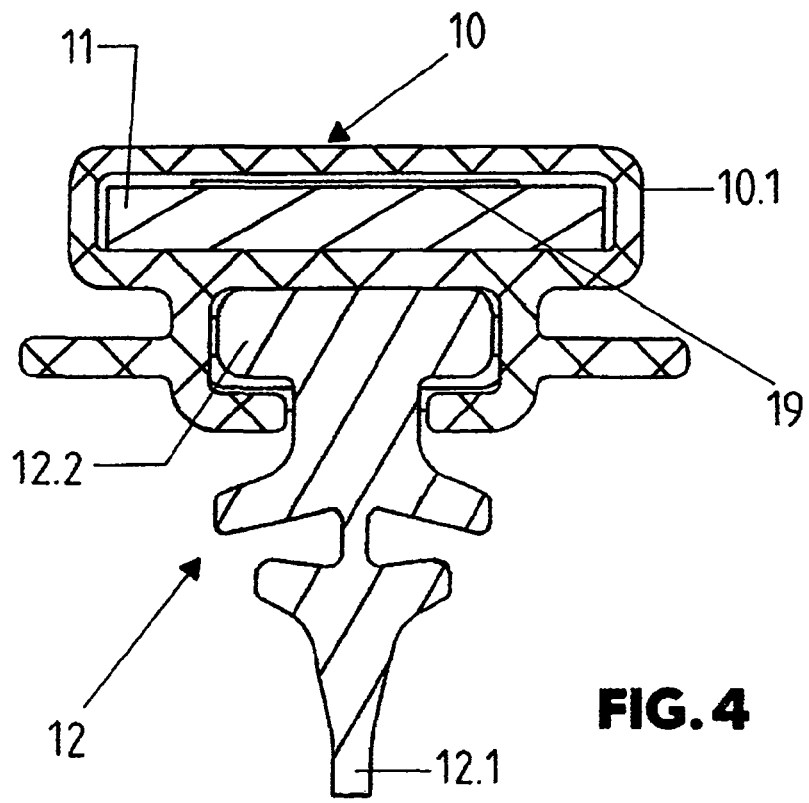
FIGS. 4 and 5 show sections through the arrangement in FIG. 3 in the area of the sectional planes I-I and II-II.
Figure 5:
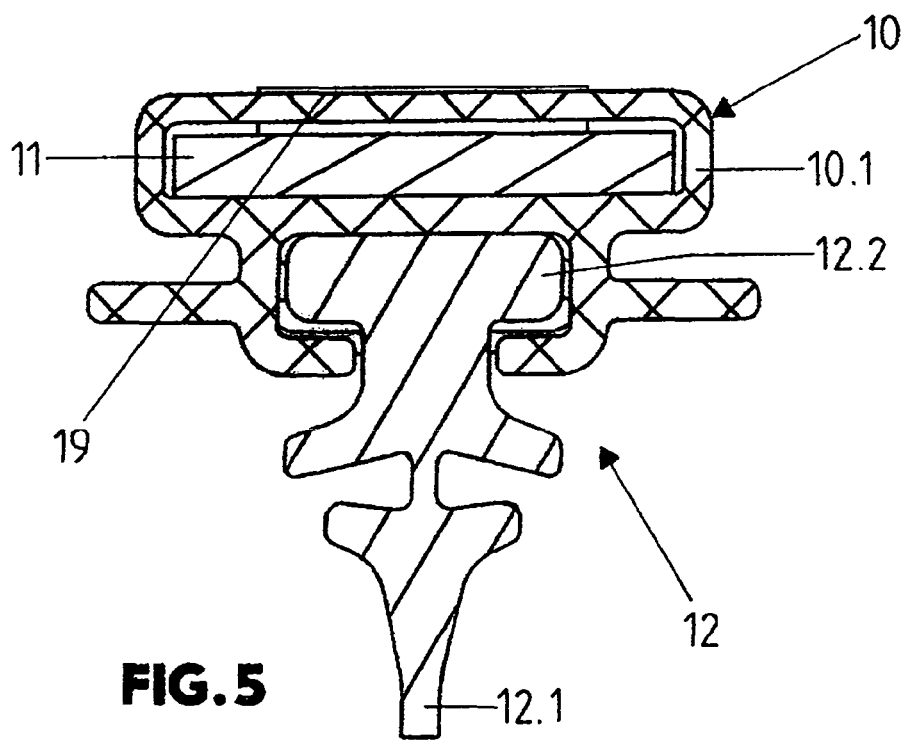

The wiper blade furthermore comprises a wiping rubber 12 consisting of rubbery-elastic profile material, which among other aspects forms the wiping lip 12.1 in contact with the vehicle windscreen 2 and which is held with a positive fit in the retaining strip with a profile section 12.2. On both sides of the wiper blade adapter 9 attached to the retaining strip 10 and to the spring rail 11 in the centre or approximately in the centre of the wiper blade 3 and spanning the retaining strip 10 in addition to the spring rail 11 on its upper side facing away from the wiping lip 12.1 in the manner of slide, a spoiler profile 13 respectively is fixed to the retaining strip. Each spoiler profile 13, which starting from the wiper blade adapter 9 extends almost to one end of the wiper blade 3, is executed with two injection ducts 14 in the way known to the person skilled in the art, of which one injection duct 14 of a spoiler profile 13 on one longitudinal side of a wiper blade is schematically implied in FIG. 2. The injection ducts 14 are respectively designed in the manner known to the person skilled in the art with a large number of jet openings for application of the washing and cleaning fluid supplied to the respective duct 14 to the vehicle windscreen, as implied by 15 in FIG. 15. The injection ducts 14 are each connected to a connection nozzle 16, which is executed for example in one piece with the wiper blade adapter 9 manufactured as a plastic moulding. Both connection nozzles 16 on the longitudinal sides of the wiper blade adapter 9 and the wiper blade 3 respectively form a common connection duct, which is linked to a hydraulic and fluid connection 17 and to be more precise, for respective connection of a flexible supply or hose line not illustrated running along the wiper arm for delivery of the washing and cleaning fluid to the injection ducts 14.

At both ends, the wiper blade 3 is closed respectively by an end cap 18 manufactured as a plastic moulding, which is held in place by snapping on to the section 11.1 of the spring rail 1.

An electric heating foil 19 is arranged on the upper side of the spring rail 11 facing the top side of the wiper blade. According to FIGS. 8 and 9, this heating foil 19, which extends over the entire length or substantially over the entire length of the spring rail 11 accommodated in the profile section 10.1 of the retaining strip 10, is composed for example of a single-layer or multiple-layer foil made of an electrically insulating material, e.g. a carrier layer or insulating layer 20 manufactured from plastic and of a metallisation 21 applied to this insulating layer 20, which (metallisation) is located on the surface side of the insulating layer 20 facing away from the spring rail 11 and is at least executed and/or structured such that it forms at least one heating conductor 21.1 extending over the entire length or substantially the entire length of the heating foil 19. With its surface side not presenting the metallisation 21, the heating foil 19 is in contact with the top side, i.e. the upper side of the spring rail 11 facing away from the wiping lip 12.1. The metallisation 21 is fixed in a suitable way to the insulating layer 20, for instance by gluing or in another appropriate manner and consists for example of a correspondingly structured metal foil and/or of an electric heating filament etc. In the embodiment presented, the metallisation 21 is structured in such a way as to form a single heating conductor 21.1, which extends starting from the central section of the spring rail 11 and the heating foil 19 at the one end, from this point back to the other end of the heating foil 19 and subsequently back to the central area of the heating foil 19. At both ends of the heating conductor 21.1, the latter and the metallisation 21 are designed with an electrical connection or contact area 22 to which the conductor of a flexible electric lead is respectively connected. The electrical connection 24 of the heating foil 19 composed of the two contact areas 22 in the centre or approximately in the centre of the wiper blade 3 is covered in the form of embodiment presented by electrical insulation 25, which is produced for example by moulding and from which the two flexible leads 23 are brought out.

At their other ends, the leads 23 are each equipped with a non-illustrated plug connector and to be more precise, for connection to an electrical supply lead, a partial length of which runs among other aspects along the wiper arm 1 and to a connection (mating connector) of this electrical supply lead provided for example in the adapter 8.

As can be gathered from FIGS. 3-7, the heating foil 19 runs in the area of the centre of the wiper blade in the case of the wiper blade 3, i.e. where the adapter 9 is also provided, with a partial length 19.1 on the upper side of the retaining strip 10 facing away from the wiping lip 12.1, i.e., outside the profile section 10.1, whereas otherwise, the heating foil 19 is accommodated directly in contact with the spring rail 11 within the profile section 10.1 of the retaining strip 10. The heating foil 19 runs through two notches for this purpose.

The electrical connection 24 is provided on the partial length 19.1. After fitting of the wiper blade adapter 9, the electrical connection 24 is located under the wiper blade adapter, so that both the electrical connection and the partial length 19.1 are covered by the installed wiper blade adapter 9.

Both electrical connecting leads 23 extend starting from the electrical connection 24 under the wiper blade adapter 9, through, i.e. between the latter and the partial length and are brought out on the front side 9.1 of the wiper blade adapter 9 on which the two fluid connections 17 are provided.

Installation of the wiper blade 3 is performed for example such that the heating foil 19 is initially inserted into the retaining strip 10 and to be more precise with both its ends ahead of the centre of the retaining strip 10. In so doing, the heating foil 19 is preferably provided with the electrical leads 23 and the insulation 25. Subsequently, the spring rail 11 is pushed into the retaining strip 10. During this installation, alignment of the heating foil is possible by means of longitudinal displacement, particularly also in such a way that the electrical connection 24, after alignment, is located in the position where the wiper blade adapter 9 is subsequently installed. Owing to the specific course of the heating foil 19 over the partial length 19.1 outside the retaining strip 10 and otherwise within this retaining strip, although the alignment and axial displacement of the heating foil is admittedly rendered more difficult, it is hereby guaranteed however that displacement or excessive displacement of the aligned heating foil 19 does not occur on installation of the spring rail 11. The described embodiment of the wiper blade 3 has several advantages:

owing to the arrangement of the heating foil on the spring rail 11 composed of metallic material, a distribution of the electric heating output over the entire wiper blade length that is at least uniform to the greatest extent is fundamentally achieved and consequently uniform heating of the wiper blade, particularly also of the wiping rubber 12 and of the injection ducts 14.

With a simplified construction and simplified production, the heating foil 19 is accommodated within the retaining strip 10 protected against external influences, particularly also against external mechanical influences.

Owing to the course of the heating foil 19 over the partial length 19.1 on the upper side of the retaining strip, improved heating of the wiper blade adapter and the fluid ducts designed in this adapter is achieved.

Optimum heat input results via the spring rail 11.

Through the electrical leads 23, which incidentally may also be grouped together to form a single, at least bifilar flexible lead, an electrical connection with the electrical supply lead running on the wiper arm 1 that is reliable and detachable at any time on changing the wiper blade is possible.

Figure 10:
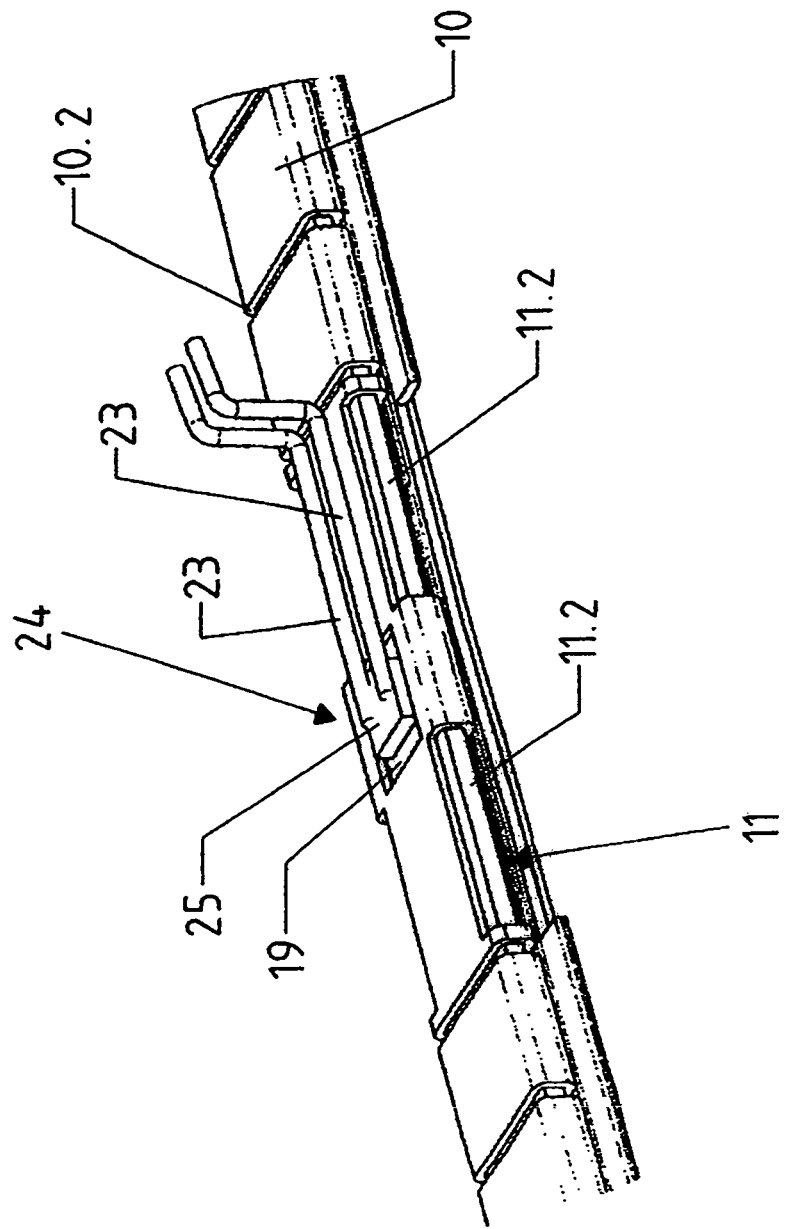
FIG. 10 shows a representation similar to that in FIG. 6 with a further form of embodiment.
Figure 11:
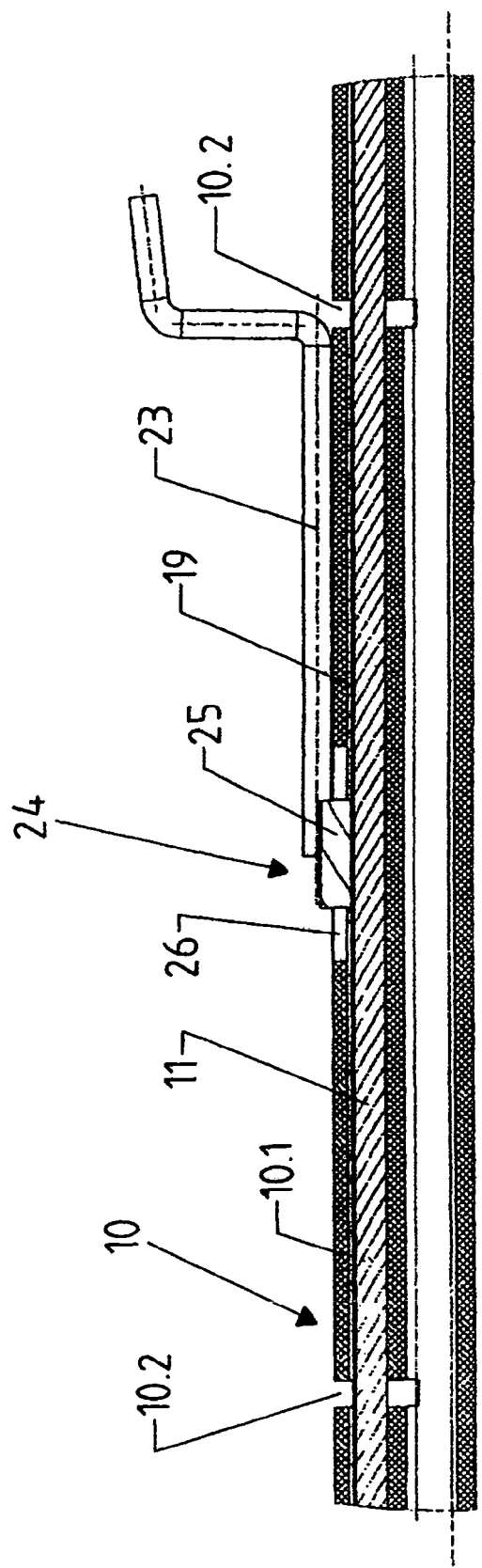
FIG. 11 shows a partial representation of a longitudinal section through the arrangement in FIG. 10.

FIGS. 10 and 11 show the retaining profile 10 with the spring rail 11 and with the heating foil 19 in a further form of embodiment that solely differs from the form of embodiment previously described in that the heating foil 19 is also in contact with the upper side of the spring rail 11 in the area of the wiper blade adapter 9 and in the area of the electrical connection 24 at this position, i.e. does not present the partial length 19.1 running on the upper side of the retaining strip. The retaining strip 10 is designed with an opening 27 in the area of the centre of the wiper blade, i.e. where the electrical connection 24 is provided, in which the connection 24 and the insulation 25 are at least partially accommodated and out of which the electrical leads 23 are brought out. The opening 27 is of sufficiently large diameter in the longitudinal direction of the wiper blade so that once again, alignment of the heating foil 19 by longitudinal displacement is possible. Installation of the wiper blade 3 is likewise preferably performed in such a way that the heating foil 19 is initially inserted into the profile section of the retaining strip 10, is then aligned in the longitudinal direction of the retaining strip 10 and subsequently the spring rail 11 is installed; though also after installation of the spring rail 11, alignment of the heating foil 19 is possible by longitudinal displacement.

The invention has been described above based on examples of embodiment. It is understood that numerous modifications and variations are possible without departing as a result from the concept on which the invention is based.

It was therefore assumed above that the wiper blade presents only one spring rail 11, which is accommodated in the retaining strip 10. In principle however, the possibility also exists of making provision for several spring rails and/or several heating foils, with at least one spring rail being accommodated in a hollow profile of the retaining strip in this case and to be more precise, together with at least one heating foil.

Especially with the form of embodiment described in connection with FIGS. 10 and 11, the possibility exists of pre-installing the at least one heating foil on the spring rail 11, for instance by gluing, e.g. with a heat-transfer adhesive and subsequently of introducing it together with the rail 11 into the retaining strip 10. The electrical connection with the leads 23 is then performed after installation of the spring rail 11 and the heating foil 19.

It was assumed above that the metallisation 21 forms a single continuous heating conductor 21.1 or heating circuit. Other embodiments are of course also possible, for example such that the metallisation 21 forms two or however more than two heating conductors 21.1 or heating circuits that are electrically parallel and respectively connected to the contact areas 22.

It was furthermore assumed above that the metallisation 21 and the at least one heating conductor 21.1 consisting of this metallisation is provided by gluing or another means on the electrically insulating layer 20. The metallisation may of course also be created in another way, for example by vapour deposit of an electrically conductive material, for example a metal and/or by electrolytic and/or chemical deposit and/or by spattering etc.

It was also assumed above that the heating foil 19 consists of the insulating layer 20 and the metallisation 21 provided on a surface side of this insulating layer. It is also basically possible that on the surface side of the insulating layer 20 presenting the metallisation 21, a covering layer concealing and protecting the metallisation 21 is applied, as implied by the broken lines 27 in FIG. 9.

LIST OF REFERENCES

1 wiper arm
2 vehicle windscreen
3 wiper blade
4 bearing section
5 articulation piece
6 wiper arm articulation
7 wiper rod
8 adapter on wiper arm side
9 wiper blade adapter
9.1 front side of wiper blade adapter
10 retaining strip
10.1 notch
11 spring rail
11.1 section of spring rail 11
11.2 periphery
12 wiping rubber
12.1 wiping lip
12.2 profile section
13 spoiler profile
14 injection duct
15 jet opening
16 connection nozzle
17 fluid connection
18 end cap
19 heating foil
19.1 partial length of the heating foil
20 insulating layer
21 metallisation
21.1 heating conductor
22 contact area
23 flexible electrical lead
24 electrical connection
25 insulation
26 opening
27 covering layer

The invention claimed is:

1. A flat wiper blade for windscreen wiper modules, comprising:
    a wiper blade body, which presents a wiping rubber forming a wiping lip;
    a spring rail;
    a retaining strip configured to retain the wiping rubber, the retaining strip possesses a profile section executed as a hollow profile that is laterally closed away from a center of the retaining strip, in which a partial length of the spring rail and a heating foil are accommodated,
    wherein the heating foil is above both the spring rail and the wiper blade, wherein, in a central area of the wiper blade, an electrical connection for the heating foil is provided, wherein the electrical connection is covered by a wiper blade adapter, wherein in the central area of the retaining strip, the retaining strip is laterally open on a profile section near the center of the retaining strip and adapted to expose the spring rail for attachment of the wiper blade adapter, wherein the spring rail comprises sections projecting over the retaining strip, and wherein at both ends, the wiper blade is closed by an end ca covering each section of the spring rail.

2. The flat wiper blade according to claim 1, wherein a surface side of the heating foil is in contact with a surface side of the spring rail and/or is connected to the spring rail.

3. The flat wiper blade according to claim 1, wherein the heating foil is accommodated over its entire length in the profile section of the retaining strip.

4. The flat wiper blade according to claim 1, wherein a partial length of the heating foil is brought out in a central area of the wiper blade from the profile section of the retaining strip or is provided running on the upper side of the retaining strip facing away from the wiping lip.

5. The flat wiper blade according to claim 1, wherein the electrical connection is composed of two contact surfaces of the heating foil connected to conductors of a flexible lead covered by electrical insulation.

6. The flat wiper blade according to claim 1, wherein the end cap is held in place by snapping onto the section of the spring rail.

7. A flat wiper blade for windscreen wiper modules, comprising:
a wiper blade body, which presents a wiping rubber forming a wiping lip;
a spring rail;
a retaining strip configured to retain the wiping rubber, the retaining strip possesses a profile section executed as a hollow profile that is laterally closed, in which a partial length of the spring rail and a heating foil are accommodated,
wherein the heating foil is above both the spring rail and the wiper blade,
wherein the heating foil comprises an insulating layer bearing a heating conductor,
wherein the heating foil is a thin sheet and the heating conductor is located on the surface side of the insulating layer facing away from the spring rail,
wherein the spring rail comprises sections projecting over the retaining strip, and
wherein at both ends, the wiper blade is closed by an end cap covering each section of the spring rail.

8. The flat wiper blade according to claim 7, wherein the insulating layer is in contact against the spring rail with a surface side facing away from the heating conductor or is connected to the spring rail over a partial length.

9. The flat wiper blade according to claim 7, wherein the heating conductor is composed of a metallisation on the insulating layer comprising one of a structured metal foil or an electric heating filament.

10. A flat wiper blade for windscreen wiper modules, comprising:
a wiper blade body, which presents a wiping rubber forming a wiping lip;
a spring rail;
a retaining strip configured to retain the wiping rubber, the retaining strip possesses a profile section executed as a hollow profile that is laterally closed away from a center of the retaining strip, in which a partial length of the spring rail and a heating foil are accommodated,
wherein the heating foil is above both the spring rail and the wiper blade,
wherein, in a central area of the wiper blade, an electrical connection for the heating foil is provided,
wherein the electrical connection is covered by a wiper blade adapter,
wherein in the central area of the retaining strip, the retaining strip is laterally open on a profile section near the center of the retaining strip and adapted to expose the spring rail for attachment of the wiper blade adapter,
wherein the spring rail comprises sections projecting over the retaining strip,
wherein at both ends, the wiper blade is closed by an end cap covering each section of the spring rail, and
wherein the retaining strip comprises notches on the hollow profile section accommodating the spring rail.

* * * * *